July 12, 1960  M. P. HAINES  2,944,648

TILTING PLATE SEGREGATOR

Filed March 12, 1958

INVENTOR.
MALCOLM P. HAINES.
BY
Lockwood, Galt, Woodard + Smith.
ATTORNEYS.

2,944,648
Patented July 12, 1960

2,944,648

TILTING PLATE SEGREGATOR

Malcolm P. Haines, Indianapolis, Ind., assignor to Merz Engineering, Inc., Indianapolis, Ind., a corporation Filed Mar. 12, 1958, Ser. No. 720,948

5 Claims. (Cl. 193—39)

This invention relates generally to devices which provide for the segregated delivery of small articles or parts, and particularly to a device of this type utilizing a tiltable platform or plate for delivering the material to discharge receptacles.

In the art of delivering segregated groups of small parts or material to mass production assembly lines, it is desirable to provide a simplified apparatus which can be remotely actuated to rapidly switch the delivery of the parts to various alternative destinations.

The principal object of the present invention is to provide a simplified apparatus of the type referred to above which is characterized by a selectively tiltable platform or plate which operates to dispatch the material to be segregated into any one of a series of discharge ducts or chutes.

A further object of the present invention is to provide a device of the type referred to above which may be remotely actuated.

The full nature of the invention will be understood from the accompanying drawings and the following description and claims:

Figure 1:
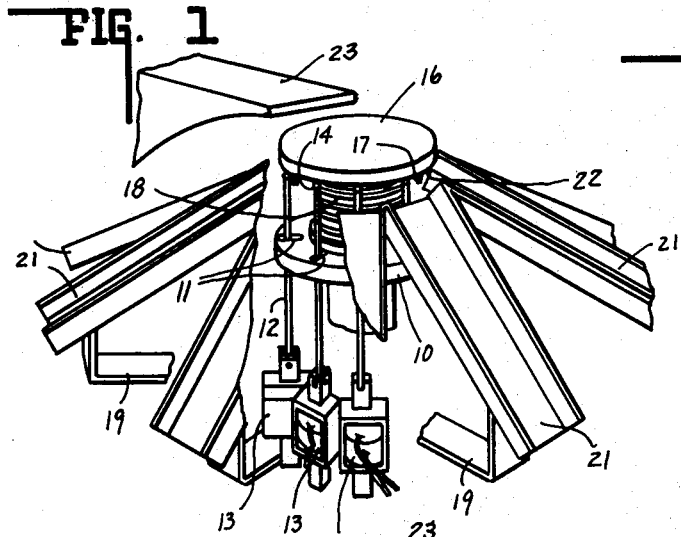
Fig. 1 represents a perspective view of an apparatus embodying the present invention with portions broken away to better show the construction.
Figure 2:
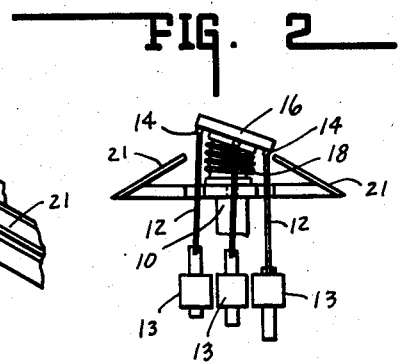
Fig. 2 represents a fragmentary side view of the apparatus of Fig. 1, and showing the tiltable platform in tilted position.

Referring initially to Figs. 1 and 2, the apparatus embodying the present invention includes a stationarily-mounted base plate 10 which is circular in configuration and slotted at 11 to provide for the free extension therethrough of thrust rods 12. The slots in the base plate are spaced circumferentially around the plate and each accommodates a thrust rod, only three of these rods, however, being shown in Fig. 1.

The thrust rods are reciprocated by means of solenoid actuators 13 which may be connected into a control circuit (not shown) to permit remote selective actuation of the solenoids. The upper ends of the thrust rods are pivotally connected at 14 to the under face of a tiltable or wobble plate 16. This plate is circular in configuration and on its under face, adjacent its marginal edge, carries a series of spaced V-stops 17.

The tiltable plate is flexibly or tiltably supported in spaced overlying relation to the base plate by means of bellows 18 formed of a suitable resilient material such as beryllium copper.

Support brackets 19 mount discharge chutes 21 in spaced relation about the periphery of the tiltable plate. Each of the discharge chutes is provided with abutments 22 adjacent the side walls of the chutes, the abutments cooperating with the V-stops carried by the tiltable plate to insure its registry and alignment with the selected discharge chute when tilted. A conveyor is generally indicated at 23 which serves to deliver the material or parts to be segregated to the tiltable plate, it being understood that other means might be employed for delivering material to it.

In operation, as may best be seen in Fig. 2, with the selected one of the solenoid actuators energized the appropriate thrust rod will be displaced downwardly so as to tilt the plate, permitting the material disposed thereon to slide into the appropriate discharge chute. It will be apparent that by selecting for energization the proper solenoid actuator, the plate may be tilted so as to deliver the material disposed thereon to any one of the discharge chutes which are mounted adjacent to it. The bellows supporting the tiltable plate permits its tilting toward the selected discharge chute. Upon de-energization of the solenoid actuator, the plate will be returned to a horizontal position by the resiliency of the bellows.

Figure 3:
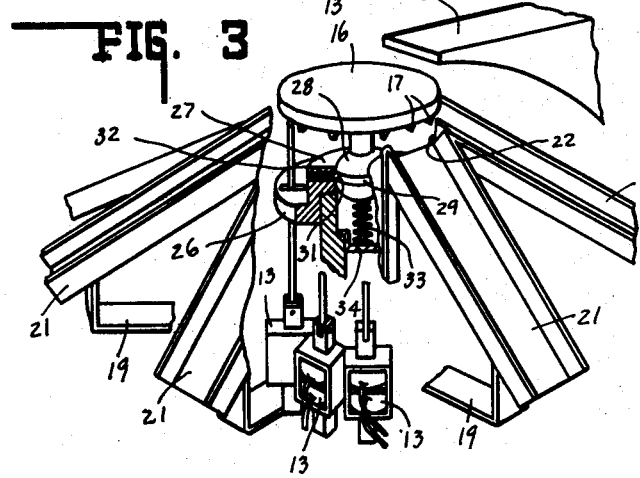
Fig. 3 represents a perspective view, similar to Fig. 1, of a modified form of the invention.
Figure 4:
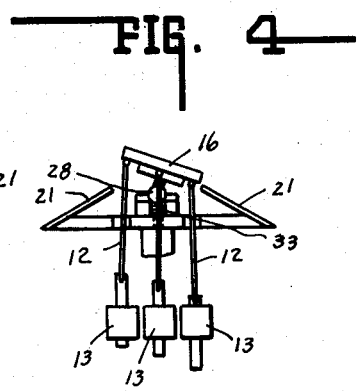
Fig. 4 represents a fragmentary side view of the apparatus in Fig. 3 with the platform shown in tilted position.

Figs. 3 and 4 disclose a modified form of the apparatus just described, parts which are identical with those shown in Fig. 1 being given the same reference numerals. In this modified form of the invention the base plate 26 is formed so as to provide an upwardly offset socket member 27. The tiltable plate is supported by a central post terminating in a ball 28 which fits within an appropriately formed opening in the socket member. The ball is provided with a circumferential groove 29 accommodating a snap ring 31. The socket member is provided with spaced radially-extending openings which accommodate compression springs 32 bearing against the snap ring, thereby permitting the ball to be rotated within the socket member and detenting with the tiltable plate in horizontal position.

A resilient means, taking the form of the tension spring 33, extends between the base of the ball and a stationary cup-shaped member 34. The tension spring is rigidly secured, as by welding or other suitable means, to the base of the cup-shaped member and is similarly secured to the underside of the ball member 28.

Referring to Fig. 4, it will be evident that with a selected one of the solenoid actuators energized, the tiltable plate will be tilted toward the selected discharge chute. When the plate is in such tilted position, the upper portion of the spring will be sidewardly displaced and the ball will be rotated the required amount within the socket member. Upon de-energization of the selected solenoid actuator, the restoring force exerted by the tension spring will return the ball to its upright position in the socket member and consequently return the plate to its normal, horizontal position.

Figure 5:
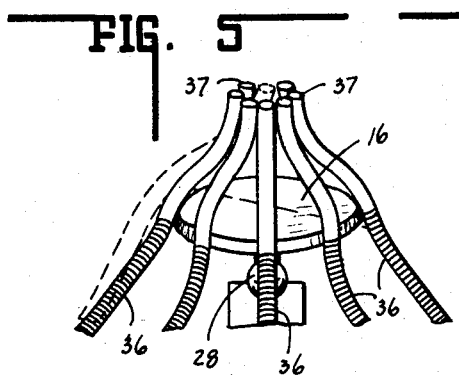
Fig. 5 is a perspective view of a further modified form of the invention.
Figure 6:
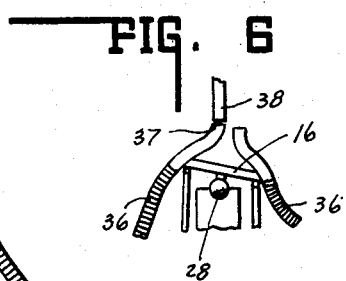
Fig. 6 is a fragmentary side view of the apparatus shown in Fig. 5 with the platform in tilted position.

A further modified form of the present invention is disclosed in Figs. 5 and 6. Parts which are identical to those shown in Figs. 1 and 3 are again given the same reference numerals. The tiltable plate shown in Fig. 5 is supported by means of the ball and socket arrangement mentioned with reference to Fig. 3, but it will be understood, however, that this modified form of the invention might also utilize the bellows type mounting for the plate mentioned with reference to Fig. 1. This modified form of the invention is adapted for use with a series of discharge tubes 36 which are disposed adjacent the marginal edge of the plate and are formed so that their upper ends 37 are closely spaced around a conveyor tube 38. It will be understood that the conveyor tube performs the function of the conveyor 23 of Figs. 1 and 3 in delivering the material to the segregating apparatus.

The lower portions of the discharge tubes are somewhat flexible so that upon tilting of the wobble plate the mouth 37 of the selected discharge tube will be brought into registry with the lower end of the conveyor tube. The action of the wobble plate in sidewardly displacing and lifting the selected discharge tube will be apparent from Fig. 6, the position assumed by the selected discharge tube upon tilting of the wobble plate also being shown in broken lines in Fig. 5. By energizing one or the other of the solenoid actuators it will be evident that the wobble plate may be tilted so as to position the selected discharge tube in material receiving relation with the conveyor tube.

The present invention thus provides a relatively simple apparatus, which may be remotely controlled, for dispatching segregated batches of parts or other material to selected destinations.

While the invention has been disclosed and described in some detail in the drawings and foregoing description, they are to be considered as illustrative and not restrictive in character, as other modifications may readily suggest themselves to persons skilled this art and within the broad scope of the invention, reference being had to the appended claims.

The invention claimed is:

1. A device for segregating material delivered thereto comprising a stationary base, a circular platform adapted to receive the material to be segregated, support means for said platform extending from said base permitting tilting of the platform relative to the base and biasing said platform into horizontal position, material discharge chutes disposed in spaced relation about said platform, selectively energizable solenoid actuators disposed in spaced relation about said platform and each adapted to tilt said platform a predetermined amount toward one or the other of said discharge chutes to release material thereto, and stop means carried by said platform engageable with cooperating abutments carried by said discharge chutes to insure registry of the tilted platform with the selected chute.

2. A device for segregating material delivered thereto comprising a stationary base, a circular platform adapted to receive the material to be segregated, support means for said platform extending from said base permitting tilting of the platform relative to the base, said support means comprising a flexible bellows member secured to said platform and biasing said platform to horizontal position, material discharge chutes disposed in spaced relation about said platform, selectively energizable solenoid actuators disposed in spaced relation about said platform and each adapted to tilt said platform a predetermined amount toward one or the other of said discharge chutes to release material thereto, and stop means carried by said platform engageable with cooperating abutments carried by said discharge chutes to insure registry of the tilted platform with the selected chute.

3. A device for segregating material delivered thereto comprising a stationary base, a circular platform adapted to receive the material to be segregated, support means for said platform extending from said base permitting tilting of the platform relative to the base, said support means including a ball and socket joint biased to dispose said platform in horizontal position, material discharge chutes disposed in spaced relation about said platform, selectively energizable solenoid actuators disposed in spaced relation about said platform and adapted to tilt said platform a predetermined amount toward one or the other of said discharge chutes to release material thereto, a resilient element acting on said platform in opposition to said actuators for returning said platform to horizontal position upon deenergization of said actuators, and stop means carried by said platform engageable with cooperating abutments carried by said discharge chutes to insure registry of the tilted platform with the selected chute.

4. A device for segregating material delivered thereto comprising a stationary base, a horizontal platform, support means for said platform extending from said base permitting tilting of the platform relative to the base, material discharge members disposed in spaced relation about said platform, selectively energizable solenoid actuators disposed in spaced relation about said platform each adapted to tilt said platform a predetermined amount to dispose one or the other of said discharge members in material receiving position, said support means including a resilient element for position upon deenergization of said actuators.

5. A device for segregating material delivered from a supply duct comprising a stationary base, a horizontal platform adapted to receive the material to be segregated, support means for said platform extending from said base permitting tilting of the platform relative to the base, material discharge ducts disposed in spaced relation about said platform, actuating means adapted when energized to tilt said platform a predetermined amount to register the mouth of the selected duct with said supply duct, said support means including a resilient element for returning said platform to horizontal position upon deenergization of said actuating means.

References Cited in the file of this patent

UNITED STATES PATENTS

| 1,038,957 | Pritchett | Sept. 17, 1912 |
| 1,759,165 | Mayer | May 20, 1930 |
| 2,656,764 | Johnson | Oct. 27, 1953 |
| 2,865,484 | Biddison | Dec. 23, 1958 |